(12) United States Patent
Duer et al.

(10) Patent No.: US 9,527,398 B2
(45) Date of Patent: Dec. 27, 2016

(54) VIRTUAL CHARGE FOR ELECTRIC VEHICLES

(75) Inventors: Armando A. Duer, West Bloomfield, MI (US); Michael L. Imel, Farmington Hills, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 1416 days.

(21) Appl. No.: 13/010,482

(22) Filed: Jan. 20, 2011

(65) Prior Publication Data

US 2012/0187916 A1   Jul. 26, 2012

(51) Int. Cl.
    *H02J 7/00* (2006.01)
    *H02J 7/04* (2006.01)
    *B60L 11/18* (2006.01)

(52) U.S. Cl.
    CPC ......... *B60L 11/1862* (2013.01); *Y02T 10/7005* (2013.01); *Y02T 10/705* (2013.01); *Y02T 10/7044* (2013.01); *Y02T 90/16* (2013.01)

(58) Field of Classification Search
    CPC .............................. B60L 11/1862; H02J 7/00
    USPC ..... 320/109, 136, 149; 191/2; 701/22, 29, 1, 701/32.3, 420, 517
    See application file for complete search history.

(56) References Cited

U.S. PATENT DOCUMENTS

| | | | | |
|---|---|---|---|---|
| 4,560,937 A | * | 12/1985 | Finger | 324/433 |
| 5,451,881 A | * | 9/1995 | Finger | 324/433 |
| 6,946,818 B2 | * | 9/2005 | Cawthorne et al. | 320/134 |
| 7,287,558 B2 | * | 10/2007 | Hobbs | 141/97 |
| 7,463,951 B2 | * | 12/2008 | Ampunan et al. | 701/1 |
| 7,692,409 B2 | * | 4/2010 | Schaper et al. | 320/157 |
| 7,698,078 B2 | * | 4/2010 | Kelty et al. | 702/63 |
| 7,778,746 B2 | * | 8/2010 | McLeod et al. | 701/22 |
| 2009/0091291 A1 | * | 4/2009 | Woody et al. | 320/109 |
| 2011/0208378 A1 | * | 8/2011 | Krueger et al. | 701/22 |
| 2011/0282527 A1 | * | 11/2011 | Inbarajan et al. | 701/22 |

\* cited by examiner

*Primary Examiner* — M'Baye Diao
(74) *Attorney, Agent, or Firm* — Leydig, Voit & Mayer, Ltd.

(57) ABSTRACT

The described method and system provides for dynamic adjustment of the lower charge threshold of an electrically-powered vehicle to allow a vehicle low on battery charge to continue to be operated. The vehicle's telematics unit monitors the charge level via the vehicle bus or other vehicle resources to determine if the vehicle is running low on electric charge. If the telematics unit determines that the charge level is approaching, meets or falls below the lower threshold, the telematics unit communicates the vehicle position to a call center along with vehicle identification data. The call center determines the amount of charge required to reach one or more local charging stations or other points of interests and proposes destination recommendations to the driver. The driver may then select one of the recommendations, and the call center transmits a new lower charge threshold to the vehicle.

18 Claims, 4 Drawing Sheets

VIRTUAL CHARGE FOR ELECTRIC VEHICLES

BACKGROUND OF THE INVENTION

The technology utilized to store, manage, and consume power in electrically-powered vehicles has been improving steadily. Indeed, electrically-powered vehicles (hereinafter electric vehicles) are now competitive with fuel-powered vehicles on many performance parameters, and typically surpass fuel-powered vehicles in measures of efficiency, environmental cleanliness, and operating noise levels. This has led to an increase in the popularity of electric vehicles and hence to a steady increase in the number of such vehicles on the road and in use at any given time.

An occasional problem affecting drivers of all types of vehicles, whether fuel-powered or electrically-powered, is running out of power and becoming stranded with an inoperable vehicle. With the increasing popularity of electric vehicles, this problem may become more and more common as many of the drivers of electric vehicles may be unfamiliar with the operating limits of their vehicles. Also contributing to this problem may be drivers' lack of knowledge as to the location of the nearest fueling or recharging station.

Conventional electric vehicles are preconfigured to operate with their batteries between certain upper and lower charge thresholds. Operating within a lower and upper threshold substantially above 0% charge and below 100% charge helps preserve the life of the battery. For example, a lower charge threshold may be 30% and an upper charge threshold may be 80%. In plug-in hybrid electric vehicles, which use both petroleum-based fuel and electrical power from a battery for propulsion, if the petroleum-based fuel is depleted and the battery charge meets or falls below the lower charge threshold, the vehicle cannot be operated even though charge is present in the battery. Thus, a driver of an electric vehicle may become stranded with an inoperable vehicle when, in fact, the vehicle battery still has charge remaining and is capable of continuing propulsion.

Therefore, it is an object in part to provide a method and system for drivers of electric vehicles to reach a fueling or recharging station or other point of interest such as their residence in the event that their fuel becomes depleted and their batteries approach, meet or fall below the lower charge threshold by making use of the remaining battery charge. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for dynamically adjusting the lower charge threshold of an electric vehicle to allow a fuel-depleted vehicle also low on battery charge to continue to be operated.

The vehicle's telematics unit monitors the fuel level and charge level via the vehicle bus or other vehicle resources to determine if the vehicle is running low on fuel or electric charge. If the telematics unit determines that the fuel is depleted and the charge level is approaching, meets or falls below the lower threshold, the telematics unit may communicate the status of the vehicle to a call center along with vehicle identification data and vehicle position. The call center determines the amount of charge required to reach one or more local fueling or recharging stations or other points of interests and proposes destination recommendations to the driver. These recommendations may be based on the amount of charge required to reach the destinations. The driver may then select one of the recommendations, and the call center transmits a new lower charge threshold to the vehicle and may also transmit turn-by-turn directions to one or more of the destinations. The vehicle reconfigures the lower charge threshold to the new lower charge threshold sent by the call center, which allows the driver to restart or continue to operate the vehicle. The call center also has the option of monitoring the charge level and adjusting the lower charge threshold further to enable the driver to reach one or more of the destinations (e.g., if the driver goes off-route).

If no fueling or recharging stations or other points of interest are within a reachable distance based on the vehicle's current level of charge, the call center may contact a service center to dispatch a service truck to the vehicle with fuel so that the vehicle can reach the one or more fueling or recharging stations or other points of interest.

Additionally, vehicle performance may be monitored and retained over time to determine an individual performance and charge profile. This profile may be utilized to provide a more accurate adjustment of the lower charge threshold in the situations described above.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for dynamically adjusting the lower charge threshold of an electric vehicle to allow a fuel-depleted vehicle to be driven. When a telematics unit on the vehicle determines that the fuel is depleted and that the remaining battery charge is approaching, meets or falls below a lower charge threshold, the telematics unit may communicate the vehicle status to a call center. The call center determines the distance from the vehicle to one or more fueling or recharging stations or other points of interest including the subscriber's residence, and the call center determines the amount of charge required to reach those destinations. The call center then provides recommendations to the vehicle, and after the driver selects a call center recommendation, the call center downloads a new lower charge threshold to the vehicle.

Figure 1:
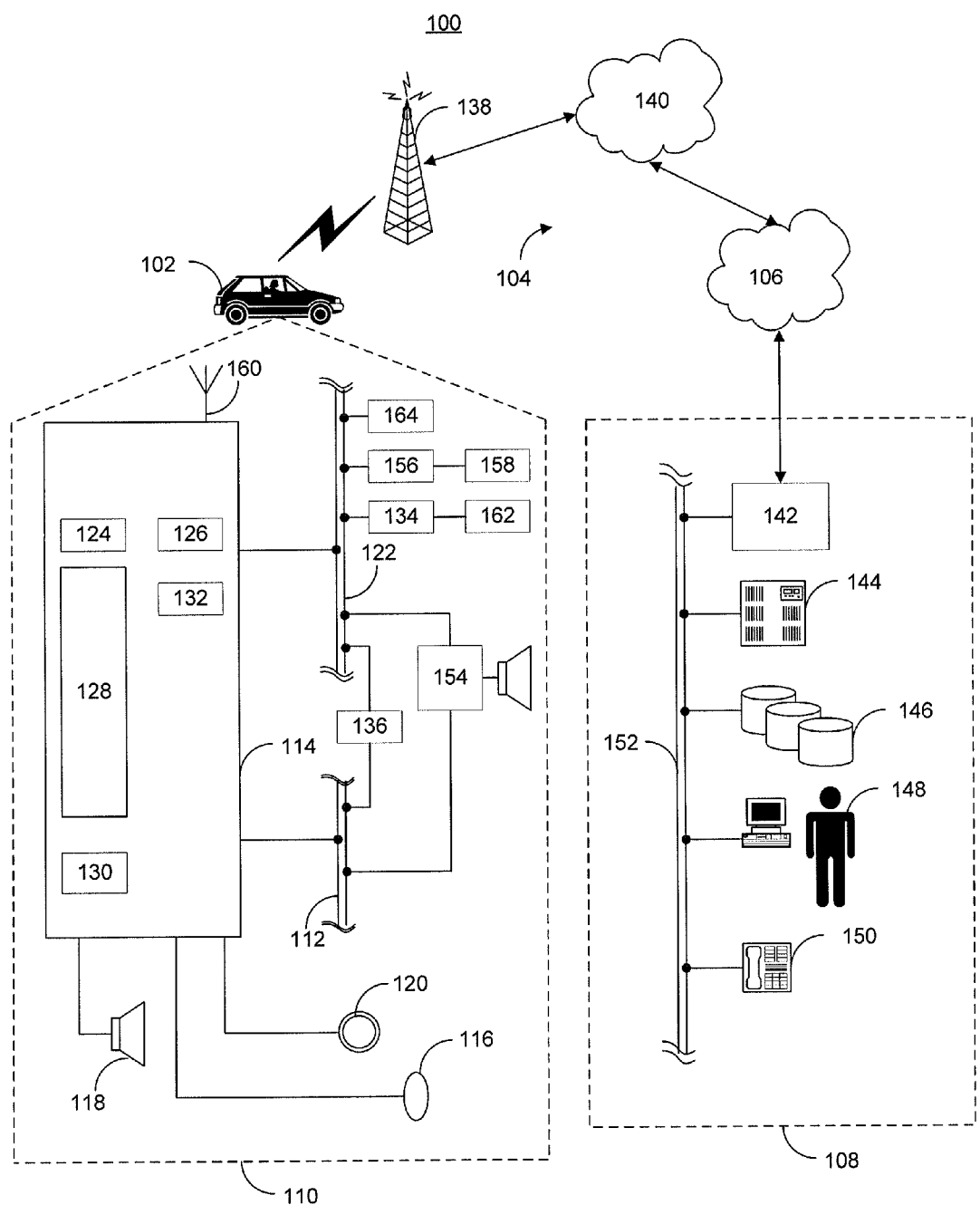
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and/or collision sensor interface modules 156 and sensors 158 located throughout the vehicle; and fuel level monitoring in connection with fuel monitoring module 164. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
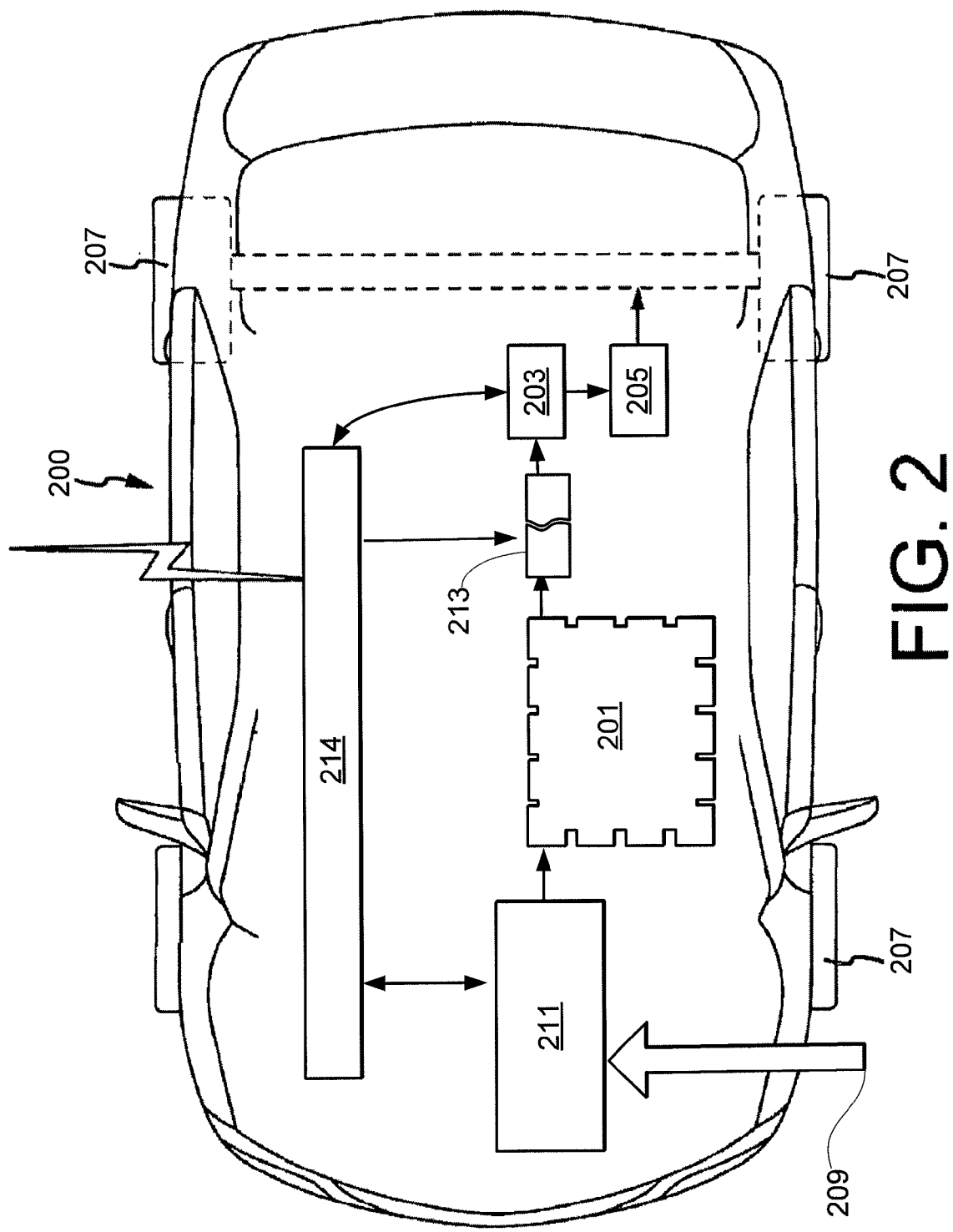
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries and Lithium Polymer batteries.

The battery 201 is conductively linkable, e.g., via a motor controller 203, to an electrical drive unit 205, e.g., an electrical motor or motors. The electrical energy may be modulated, voltage-modified, or otherwise modified by the motor controller 203 as needed to drive the electrical drive unit 205. The electrical drive unit 205 is linked or linkable to a ground engaging drive, typically including one or more wheels 207.

In one optional implementation, a plug interface 209 is provided in order to charge the battery 201, although it will be appreciated that the teachings herein apply beyond vehicles having plug-in architectures as well. The plug interface 209 is linked to the battery 201 via a charge controller 211. The telematics unit 214 (114) is adapted to receive information from the controller 211 as discussed above and to convey data regarding the battery as will be discussed more fully hereinafter. An optional aspect of the vehicle 200 and battery 201 is the ability to electrically disconnect the battery 201 from the rest of the vehicle by controlling at least one and preferably two or more high voltage contactors 213 if an adverse condition is detected.

In an implementation, the responsibility for battery charge state sensing and analysis is vested in the charge controller 211. Alternatively, the charge controller 211 may be responsible for sensing battery charge state, while the telematics unit 214 is responsible for analysis of charge state. The charge controller 211 may further be responsible for configuration and reconfiguration of a lower charge threshold, below which the battery 201 ceases to provide power to the motor controller 203 and electrical drive unit 205. Alternatively, the telematics unit 214 may be responsible for configuration and reconfiguration of the battery's lower charge threshold. In either case, a call center 108 may transmit a new lower charge threshold to the telematics unit 214 and either the telematics unit 214 or the charge controller 211 may reconfigure the lower charge threshold of the battery 201.

Figure 3:
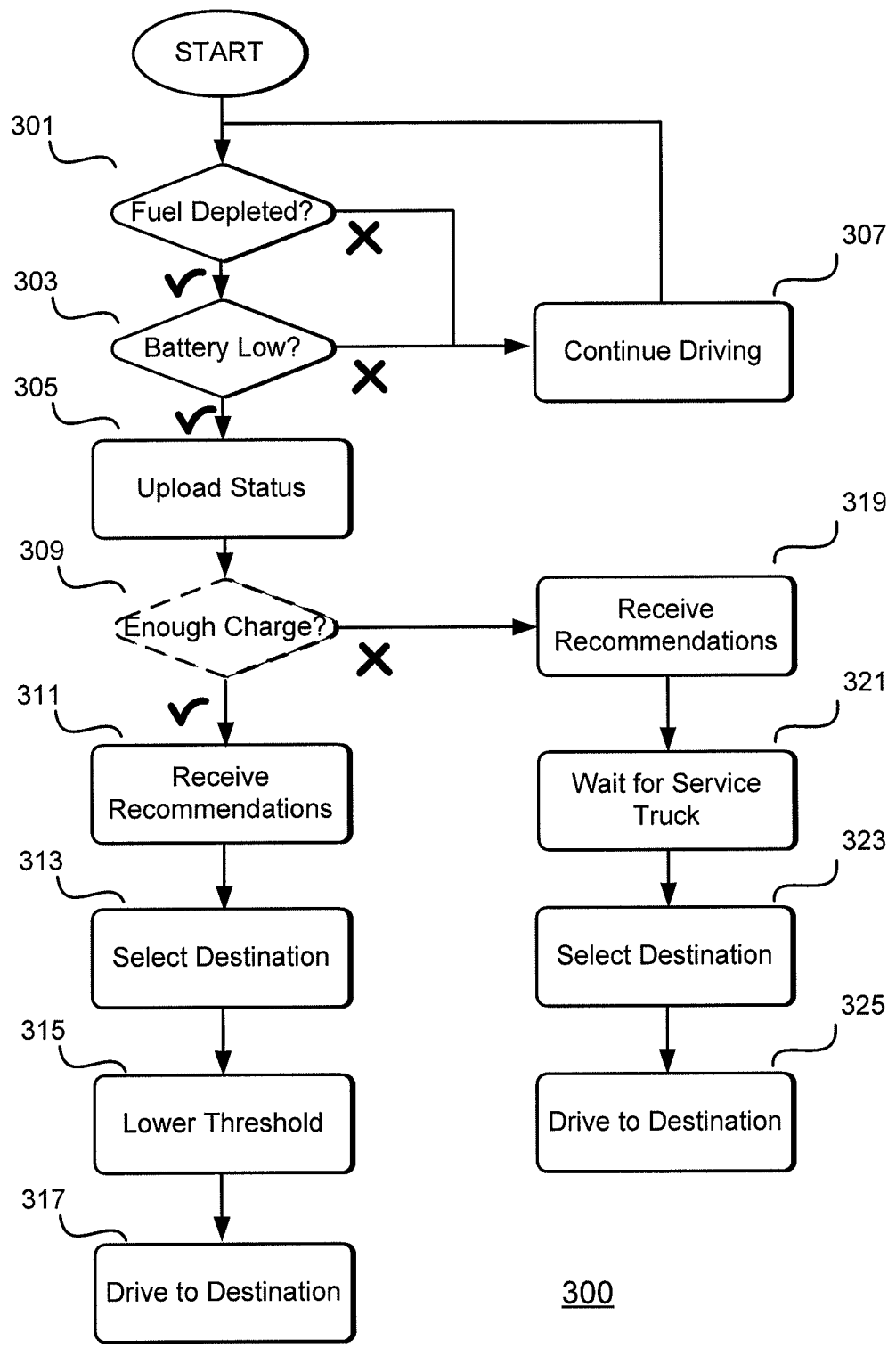
FIG. 3 is a flowchart illustrating a process for lowering a vehicle's lower battery charge threshold when the vehicle is determined to have depleted its fuel supply and its battery is determined to be approaching the preconfigured lower threshold.

With further reference to the architecture of FIGS. 1 and 2, and turning more specifically to FIG. 3, which depicts a flow chart 300 for one implementation of the present invention in the context of a plug-in hybrid vehicle, the telematics unit 114 (214) monitors the vehicle's fuel level through the vehicle bus 122 and battery charge state through the charge controller 211. If the telematics unit 114 determines that the fuel is depleted 301 and that the battery charge is approaching, meets, or falls below the lower threshold 303, it uploads status information regarding the vehicle 305 to the call center 108 through the network as shown in FIG. 1.

The status information may include the vehicle fuel status, battery charge status, vehicle position, standard vehicle identification data, and other data. If the telematics unit 114 does not determine that the fuel is depleted and the battery charge is approaching its lower charge threshold, no action is taken and the vehicle may continue to operate normally 307. It will be appreciated by one of ordinary skill in the art that in other implementations involving other types of vehicles, such as an electric vehicle with no fuel supply, determining that the fuel is depleted 301 may not be performed, and the telematics unit 114 may upload vehicle status information 305 based solely on the battery charge approaching, meeting or falling below the lower threshold 303. It will also be appreciated that some of the processes in FIG. 3, such as determining whether the fuel is depleted 301 and determining whether the battery charge is approaching, meeting, or falling below its lower charge threshold 303, may be performed in a different order or in parallel.

After status information is uploaded 305 to the call center 108, the call center 108 uses the status information to locate the vehicle and determine the distance from the vehicle to one or more fueling or recharging stations or other points of interest including the subscriber's residence. The call center 108 may also determine the amount of charge required to reach the one or more fueling or recharging stations or other points of interest based on the distance from the vehicle position. This determination may further be based on an individual vehicle profile comprised of vehicle performance and charge data previously gathered regarding the vehicle. Based on the amount of charge required to reach the one or more fueling or recharging stations or other points of interest, the call center 108 may transmit recommendations 311 to the occupant or occupants of the vehicle through the telematics unit 114. For example, the call center 108 may recommend one or more fueling or recharging stations or other points of interests that require a minimum amount of charge to reach, so that the change in charge threshold required is minimized.

After a vehicle occupant selects one of the recommendations 313 provided by the call center 108, the call center 108 downloads a new lower charge threshold to the vehicle and the vehicle reconfigures the battery's lower charge threshold 315 to allow the vehicle to be restarted or to continue to be operated so that it can be driven to the selected destination 317. This new lower charge threshold may correspond to the amount of charge required by the vehicle to reach the selected destination. The call center 108 may also provide directions to the vehicle to reach the selected destination via turn-by-turn voice directions over the speaker 118, a GPS interface, or other methods for providing directions.

In a further implementation of the present invention, the call center 108 may determine that no fueling or recharging stations or other points of interest can be reached given the battery charge state 309, and the call center 108 may contact a service center to dispatch a service truck to the vehicle, in addition to providing at least one recommended destination 319. The vehicle occupant or occupants would then wait for the service truck to arrive 321, and after receiving enough fuel from the service truck to reach the at least one recommended destination, select a destination 323 and drive to that destination 325. The call center 108 may also provide directions to the vehicle to reach the selected destination. Again, it will be appreciated that one skilled in the art would recognize that some of the described steps can be performed in a different order or in parallel, such as having the vehicle occupant first select a destination 323 before waiting for the service truck's arrival 321. It will also be appreciated that the service truck may provide the vehicle with fuel or battery charge or other means of assisting the vehicle in reaching the at least one recommended destination.

Figure 4:
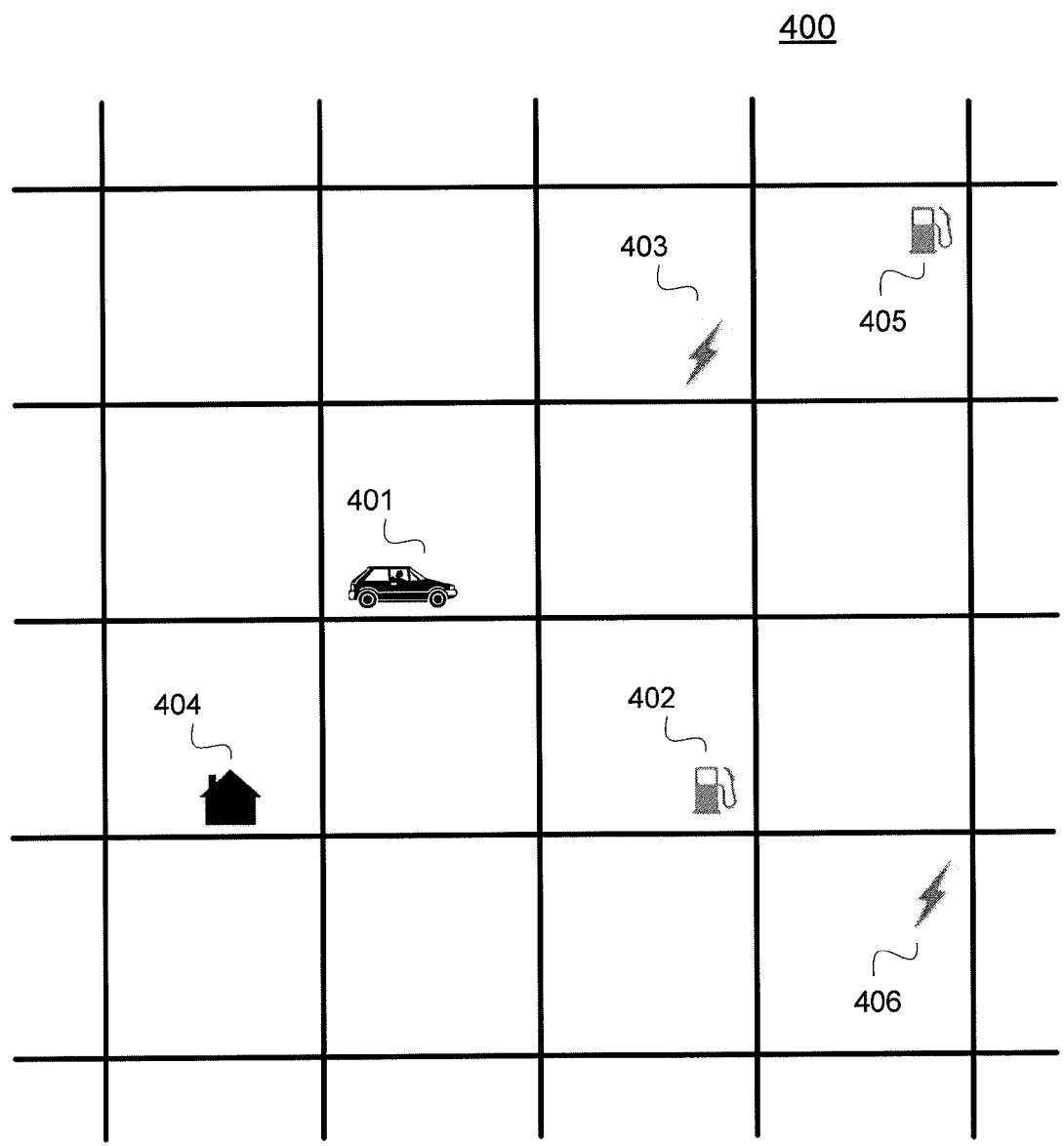
FIG. 4 is a simplified geographical grid illustrating a vehicle's position in relation to fueling stations or recharging stations or other points of interest.

Turning to the illustrative geographical grid or street map 400 of FIG. 4, with reference to FIGS. 1, 2 and 3, the call center 108 may locate the position of the vehicle 401 and determine the amount of charge required for the vehicle to travel from its position 401 to potential destinations 402-406, wherein the potential destinations are fueling stations 402 and 405, recharging stations 403 and 406 or other points of interest such as the subscriber's home 404. If, for example, the call center 108 determines that the three destinations requiring the least battery charge to reach are 402-404, the call center 108 may transmit these three destinations as recommendations to the vehicle, may provide driving directions to the vehicle, and may lower the lower battery charge threshold so that the vehicle can reach a destination selected by the driver. In another example, if the call center 108 determines that all potential destinations 402-406 cannot be reached given the vehicle's current battery charge, the call center 108 may transmit instructions to the vehicle to wait for a service truck to arrive.

In yet another further implementation of the present invention, the call center 108 may continue to monitor the battery charge level and the vehicle position after the battery charge threshold has been lowered 315. If the driver goes off course, makes stops, decides to go to a different destination, or encounters some other situation that requires the vehicle to use more battery charge than previously determined by the call center 108, the call center may determine that the lower battery charge threshold should be lowered further to allow the vehicle to reach its destination. The call center 108 may then download a new lower battery charge threshold to allow the driver to reach one or more destinations. In yet another further implementation, if the situation has changed such that the vehicle cannot reach any fueling station or recharging station or other point of interest, the call center 108 may contact a service center to dispatch a service truck to the vehicle to provide the vehicle with enough fuel to reach at least one of the fueling or recharging stations or other points of interest.

It will be appreciated that the described system and method allow the lower charge threshold of an electric vehicle to be dynamically adjusted so that a fuel-depleted vehicle also low on battery charge can continue to operate. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for adjusting a lower charge level threshold of an electrically-powered vehicle to allow a vehicle low on battery charge to continue to be operated at charge levels below a level at which the vehicle would have become inoperable absent the adjustment, the method comprising:
   determining, by a processor, that the vehicle is likely to become inoperable as a result of a battery charge level fulfilling a condition selected from the group consisting of: the battery charge level coming within a predetermined range of a preconfigured lower charge level threshold, the battery charge level meeting a preconfigured lower charge level threshold, and the battery charge level falling below a preconfigured lower charge level threshold; and
   lowering, by a processor, the lower charge level threshold of the vehicle's battery from the preconfigured lower charge level threshold to a second lower charge level threshold.

2. The method of claim 1, the method further comprising:
   determining, by a processor, that the vehicle's fuel supply is depleted.

3. The method of claim 2, the method further comprising:
   uploading, by a telematics unit, status information regarding the vehicle to a call center, wherein the status information regarding the vehicle comprises the vehicle's battery charge level and the vehicle's location.

4. The method of claim 3, the method further comprising:
   receiving, by the telematics unit, at least one recommended destination based on the vehicle's remaining battery charge;
   communicating, by the telematics unit, the at least one recommended destination to an occupant of the vehicle; and
   receiving, by the telematics unit, from the call center, the second lower charge level threshold that the lower charge level threshold of the vehicle's battery is to be lowered to.

5. The method of claim 4, wherein the at least one recommended destination is selected from the group consisting of: a fueling station, a recharging station, and a subscriber's home address.

6. The method of claim 4, wherein the second predetermined amount that the lower charge level threshold of the vehicle's battery is to be lowered to is based on a distance between the vehicle's position and the at least one recommended destination.

7. The method of claim 6, wherein the second lower charge level threshold that the lower charge level threshold of the vehicle's battery is to be lowered to is also based on an individual vehicle profile comprising data pertaining to the vehicle's past performance and battery charge.

8. The method of claim 6, further comprising:
   receiving, by the telematics unit, additional adjustments to the lower charge level threshold of the vehicle's battery, where-in the additional adjustments are based on the amount of charge required by the vehicle to travel from the vehicle's current location to the at least one recommended destination.

9. The method of claim 8, the method further comprising:
   if an additional adjustment to the lower charge level threshold of the vehicle's battery cannot be made because the vehicle's battery does not have enough charge remaining to allow the vehicle to travel from the vehicle's current location to the at least one recommended destination, communicating, by the telematics unit, to an occupant of the vehicle to wait for a service truck, wherein the service truck is dispatched by the call center to provides the vehicle with assistance in reaching the at least one recommended destination.

10. The method of claim 9, wherein the service truck provides the vehicle with at least one of the group consisting of: fuel; electrical power; and towing services.

11. The method of claim 3, the method further comprising:
   receiving, by the telematics unit, at least one recommended destination;
   communicating, by the telematics unit, to an occupant of the vehicle the at least one recommended destination; and
   communicating, by the telematics unit, to an occupant of the vehicle to wait for a service truck, wherein the service truck is dispatched by the call center and provides the vehicle with assistance in reaching the at least one recommended destination.

12. The method of claim 11, wherein the at least one recommended destination is at least one of the group consisting of:
   a fueling station;
   a recharging station; and
   a subscriber's home address.

13. The method of claim 12, wherein the service truck provides the vehicle with at least one of the group consisting of: fuel; electrical power; and towing services.

14. A method for dynamically adjusting a lower charge level threshold of an electrically-powered vehicle to allow a vehicle low on battery charge to continue to be operated at charge levels below a level at which the vehicle would have become inoperable absent the adjustment, the method comprising:
   receiving, at a call center, status information regarding the vehicle when the vehicle's battery charge level satisfies a condition selected from the group consisting of: the battery charge level coming within a predetermined range of a preconfigured lower charge level threshold, the battery charge level meeting a preconfigured lower charge level threshold, and the battery charge level falling below a preconfigured lower charge level threshold; and
   transmitting, by the call center to the vehicle, instructions for the vehicle to adjust the lower charge level threshold from the preconfigured lower charge level threshold to the second lower charge level threshold.

15. The method of claim 14, the method further comprising:
   transmitting, by the call center to the vehicle, a new lower charge level threshold for the vehicle based on the at least one destination recommendation.

16. The method of claim 15, the method further comprising:
   transmitting, by the call center to the vehicle, directions from the vehicle's position to the at least one destination recommendation.

17. The method of claim 16, the method further comprising:
transmitting, by the call center to the vehicle, instructions to wait for a service truck, wherein the service truck is dispatched by the call center and provides the vehicle with at least one of the group consisting of: fuel and battery charge.

18. A system for dynamically adjusting a lower charge level threshold of an electrically-powered vehicle to allow a vehicle low on battery charge to continue to be operated at charge levels below a level at which the vehicle would have become inoperable absent the adjustment, the system comprising:
the electrically-powered vehicle;
a telematics unit connected to the vehicle, adapted to monitor the vehicle's remaining battery charge level, to send and receive communications and data to and from a call center, and to raise and lower the lower charge level threshold of the vehicle's battery; and
the call center, adapted to send communications and data to the vehicle, to receive communications and data from the vehicle, to determine the distance from the vehicle's position to at least one destination, to determine the amount of charge required for the vehicle to travel from the vehicle's position to the at least one destination, to determine a new lower charge level threshold for the vehicle battery, and to communicated the new lower charge level threshold to the vehicle;
wherein the at least one destination is selected from the group consisting of: a fueling station, a recharging station, and a subscriber's home address.

\* \* \* \* \*